(12) United States Patent
Mackintosh

(10) Patent No.: US 8,715,462 B2
(45) Date of Patent: May 6, 2014

(54) PROCESS AND APPARATUS FOR RECYCLING COATED PAPER PRODUCTS

(76) Inventor: Alexis Fosse Mackintosh, Vancouver (CA)

( * ) Notice: Subject to any disclaimer, the term of this patent is extended or adjusted under 35 U.S.C. 154(b) by 53 days.

(21) Appl. No.: 13/266,868

(22) PCT Filed: Apr. 30, 2010

(86) PCT No.: PCT/CA2010/000646
§ 371 (c)(1),
(2), (4) Date: Oct. 28, 2011

(87) PCT Pub. No.: WO2010/124380
PCT Pub. Date: Nov. 4, 2010

(65) Prior Publication Data
US 2012/0048491 A1    Mar. 1, 2012

Related U.S. Application Data

(60) Provisional application No. 61/174,466, filed on Apr. 30, 2009, provisional application No. 61/182,378, filed on May 29, 2009.

(51) Int. Cl.
*D21B 1/08*  (2006.01)
*D21B 1/32*  (2006.01)
*D21C 5/02*  (2006.01)

(52) U.S. Cl.
USPC ............ 162/5; 162/4; 162/6; 162/7; 162/9; 162/14; 162/24; 162/63; 162/70; 162/88

(58) Field of Classification Search
USPC ............ 162/4–9, 14, 24, 234, 261, 262, 264, 162/63, 70, 73, 87, 88, 91
See application file for complete search history.

(56) References Cited

U.S. PATENT DOCUMENTS

| | | | |
|---|---|---|---|
| 3,034,994 A | 5/1962 | Braithwaite et al. | |
| 3,473,494 A | 10/1969 | Siracusa | |
| 3,584,587 A | 6/1971 | Siracusa | |
| 3,721,575 A | 3/1973 | Jarowenko | |
| 3,961,913 A | 6/1976 | Brenneman et al. | |
| 4,063,903 A | 12/1977 | Beningson et al. | |
| 4,152,119 A | 5/1979 | Schulz | |
| 4,225,457 A | 9/1980 | Schulz | |
| 4,278,471 A | 7/1981 | Whittingham | |
| 4,281,063 A | 7/1981 | Tsao et al. | |
| 4,416,727 A | 11/1983 | Elton et al. | |
| 4,496,365 A | 1/1985 | Lindemann | |
| 4,661,119 A | 4/1987 | Andersson et al. | |
| 5,100,066 A | 3/1992 | Frei | |
| 5,429,645 A * | 7/1995 | Benson et al. | 44/589 |
| 5,431,702 A | 7/1995 | Schulz | |
| 5,562,743 A | 10/1996 | Daugherty et al. | |
| 5,762,656 A | 6/1998 | Burke et al. | |
| 5,779,164 A * | 7/1998 | Chieffalo et al. | 241/17 |
| 5,888,256 A | 3/1999 | Morrison | |
| 6,113,662 A | 9/2000 | Sprules | |
| 6,458,240 B1 | 10/2002 | Bouchette et al. | |
| 6,506,223 B2 | 1/2003 | White | |
| 7,252,691 B2 | 8/2007 | Philipson | |
| 2009/0030215 A1 | 1/2009 | Dignan et al. | |
| 2010/0154296 A1 | 6/2010 | Malhorta | |
| 2012/0063969 A1 | 3/2012 | Cornish et al. | |

FOREIGN PATENT DOCUMENTS

| | | |
|---|---|---|
| CA | 1181397 A1 | 1/1985 |
| WO | 2007111605 A1 | 10/2007 |
| WO | 2009127727 A1 | 10/2009 |
| WO | 2010006881 A1 | 1/2010 |

\* cited by examiner

*Primary Examiner* — Dennis Cordray

(74) *Attorney, Agent, or Firm* — Oyen Wiggs Green & Mutala LLP

(57) ABSTRACT

Methods and apparatus are provided for exploiting coated paper products such as coated paper cups. End products include biofuels that have a high energy density. The biofuels may be mixed with coal or other fuels and have good binding characteristics. In some embodiments, useful chemicals such as HMF are produced. The methods involve heat treatment at relatively mild temperatures and pressures under acidic conditions.

25 Claims, 7 Drawing Sheets

PROCESS AND APPARATUS FOR RECYCLING COATED PAPER PRODUCTS

CROSS-REFERENCE TO RELATED APPLICATIONS

This application is a 371 of PCT/CA2010/000646, filed 30 Apr. 2010, which claims priority from U.S. provisional application Nos. 61/174,466 filed on 30 Apr. 2009 and entitled PROCESS AND APPARATUS FOR RECYCLING COATED PAPER PRODUCTS and 61/182,378 filed 29 May 2009 and entitled PREPARATION OF 5-(HYDROXYMETHYL)-FURFURAL, DERIVATIVES AND OTHER PRODUCTS, each of which is hereby incorporated herein by reference. For purposes of the United States of America, this application claims the benefit under 35 U.S.C. §119 of U.S. provisional application Nos. 61/174,466 filed on 30 Apr. 2009 and entitled PROCESS AND APPARATUS FOR RECYCLING COATED PAPER PRODUCTS and 61/182,378 filed 29 May 2009 and entitled PREPARATION OF 5-(HYDROXYMETHYL)-FURFURAL, DERIVATIVES AND OTHER PRODUCTS, each of which is hereby incorporated herein by reference.

TECHNICAL FIELD

This invention relates to paper recycling, and more specifically, to methods and apparatus for recycling coated paper products.

BACKGROUND

Paper products are used in a wide variety of applications. For example, plastic coatings are used in packaging, paper cups, containers for food or beverages, and the like. The plastic coatings in these products can impart water resistance and improve wet-strength. Plastic coated paper products (such as hot beverage cups and food wrappers) are often excluded from recycling programs, because the coating is incompatible with current recycling technology. This adds to the accumulation of waste in landfills.

SUMMARY

There is a need for a method of recycling coated paper products into useable products. Aspects of this invention provide methods and apparatus that address this need.

One aspect of the invention provides a method of recycling coated paper products. The method involves breaking-up coated paper products to make a pulp. The pulp is heated in a basic solution, and is cooled and de-watered to yield a mixture comprising de-coated pulp and coating fines. The mixture is then heated under acidic conditions to produce residual solids and useable chemicals. The residual solids and useable chemicals may be separated.

The residual solids have an excellent energy density and can be burned as a green replacement for coal or other fuels. The energy density of the residual solids can be on the order of 27 to 30 GJ/Tonne. The residual solids may be pelletized for use as a fuel, used as a binder in pelletizing coal or other fuels, and/or mixed with coal or other fuels to provide blended fuels.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements may not have been shown or described in detail to avoid unnecessarily obscuring the disclosure. Accordingly, the description and drawings are to be regarded in an illustrative, rather than a restrictive, sense.

This invention provides a method and apparatus for recycling coated paper products into useable products, such as useable chemicals and residual solids. The invention also provides a method of producing useable chemicals and residual solids. The coated paper products may comprise plastic coated paper products such as: beverage cups, fast food wrappers, paper plates, paper bags for take-out food, coated cardboard, baby diapers, mixtures thereof, and the like.

Polyethylene, also referred to as polycoat, is a commonly-used plastic coating in coated paper products. Polycoat can impart water resistance and improve wet-strength. However, the methods of the present invention are not restricted to polyethylene-coated paper or even plastic-coated paper and may be used with any number of coatings, for example, waxes, lacquers, varnishes, adhesives and hot melts. The methods may be used with most coated paper products wherein the individual fibers are not embedded in a plastic or hydrophobic matrix.

Figure 1:
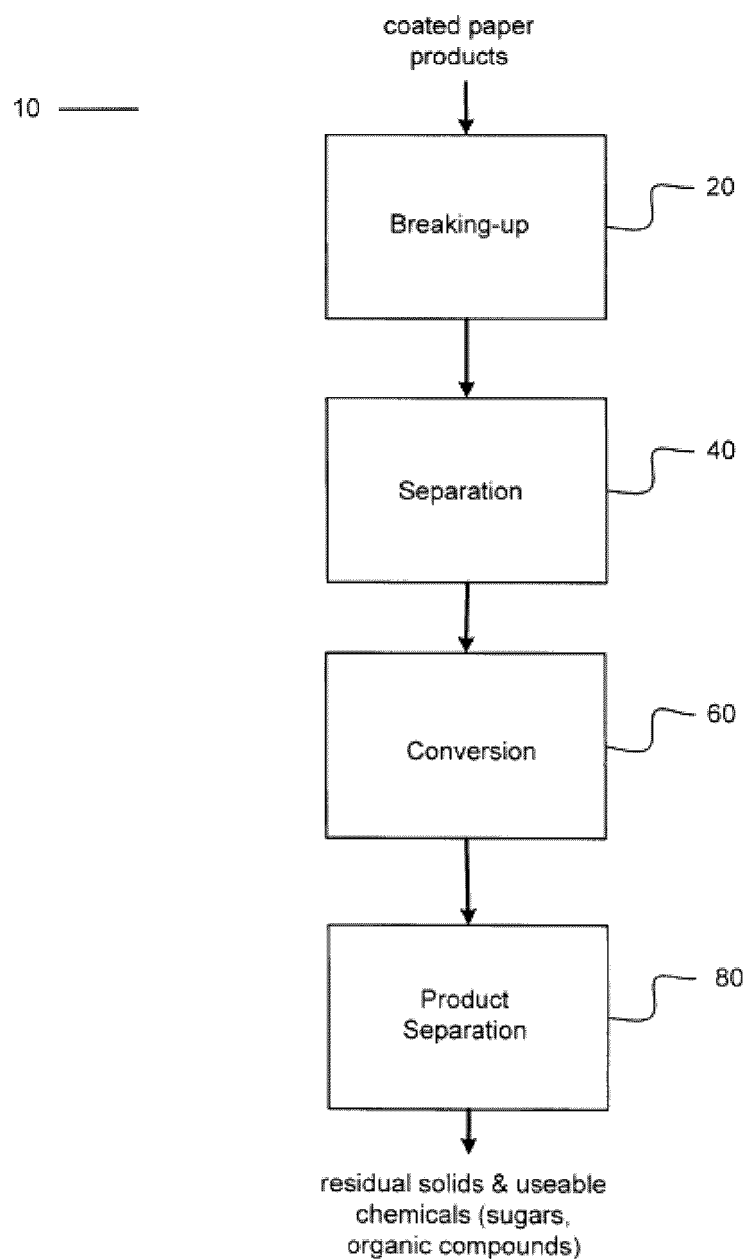
FIG. 1 is a block process diagram according to an example embodiment of the invention.

FIG. 1 shows a block diagram of a method 10 according to an embodiment of the invention. Coated paper products are subjected to a breaking-up step 20 to form a pulp. The pulp is then subjected to a separation step 40 to form a mixture comprising de-coated pulp and coating fines. This mixture is subjected to a conversion step 60, wherein the de-coated pulp and coating fines are converted into useable products. In a product separation step 80, the useable products may be separated and optionally purified to provide useful end products.

The breaking-up step 20 acts to break-up and at least partially pulp the paper in coated paper products. The resulting pulp may comprise intact cellulose fibers bonded with some coating, broken cellulose fibers bonded with some coating, de-coated cellulose fibers, particles of coated paper, or a combination of these. Separation stage 40 acts to at least partially break bonds between the cellulose fibers or the paper and the coating, resulting in a mixture comprising de-coated pulp and coating fines. The de-coated pulp may comprise cellulose fibers bonded with some coating, de-coated cellulose, or a combination thereof.

The paper of coated paper products may predominantly comprise cellulose fibers. However, other types of fibers, such as hemicellulose fibers, may be present. In an embodiment of the invention, the coated paper products are made from wood fiber. Alternatively, the invention may be practiced with paper made from other types of fibers. For example, the coated paper products may be made from cotton, linen, hemp, bamboo, jute, bagasse, straw, esparto, or combinations of these.

Figure 2:
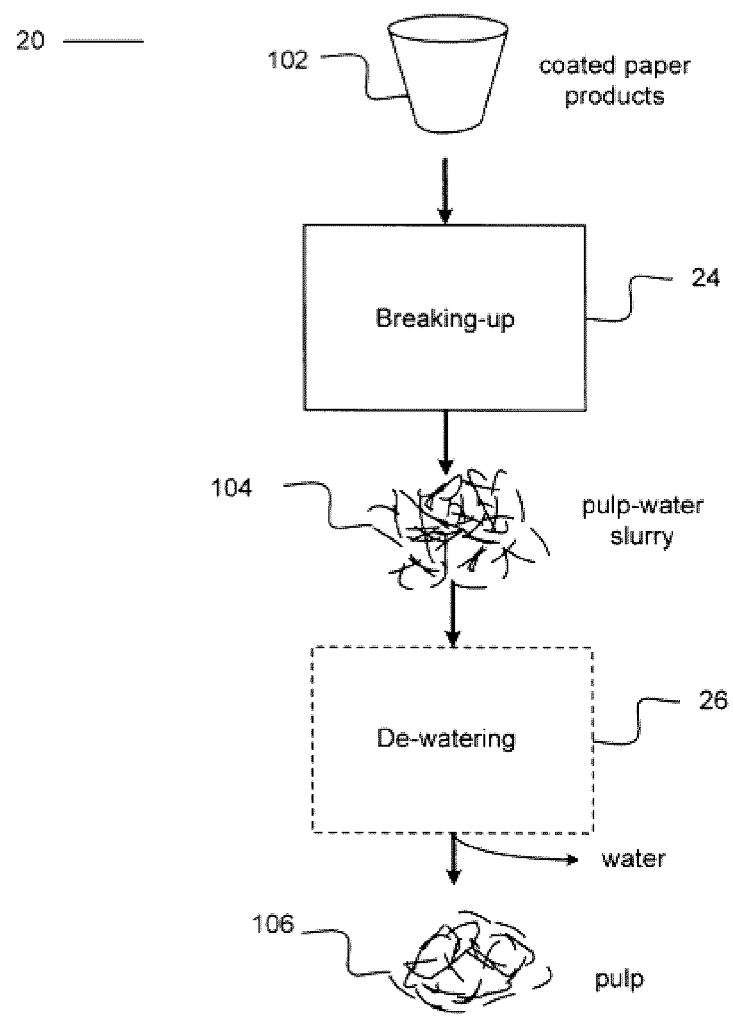
FIG. 2 is a block process diagram illustrating one possible arrangement for the breaking-up step of FIG. 1.

FIG. 2 is a block diagram showing a possible breaking-up step 20. Coated paper products 102 may be broken-up in water in a breaking-up stage 24 to produce a pulp-water slurry 104 comprising pulp 106. Breaking-up stage 24 may comprise disintegrating or pulping coated paper products 102 in water. Additionally or alternatively, breaking-up stage may comprise breaking-up coated paper products 102 using other mechanical processes, such as shredding, tearing, cutting, grinding, milling, chopping, beating, subjecting to waterjets, or a combination of these. Optionally, pulp-water slurry 104 can be de-watered in a de-watering stage 26 to yield pulp 106.

In breaking-up stage 24, a disintegrator may be used to break-up coated paper products 102. In one embodiment, a pulper is used to agitate coated paper products 102 in water, thereby disintegrating and dispersing the coating-bonded cellulose fibers, the de-coated cellulose fibers, particles of coated paper or combination thereof. The pulper may comprise a water jet pulper, a hydropulper, or another type of pulper. In other embodiments, other types of disintegrators are used, for example choppers, comminutors, grinders, mills, shredders and water jets.

Pulp 106 may comprise intact cellulose fibers bonded with some coating, broken cellulose fibers bonded with some coating, de-coated cellulose fibers, particles of coated paper, or a combination of these. In an example embodiment, coated paper products are agitated in breaking-up stage 24 for a period of time that is sufficient to convert the coated paper products into small, water-soaked particles of coated paper. In an example embodiment, breaking-up stage 24 is carried out at ambient temperature and pressure.

The properties of pulp 106 may depend on a number of factors, such as the fiber source and the pulp refining methods that were used in making the paper of the coated paper product. The properties of pulp 106 may also depend on the equipment and parameters used in breaking-up stage 24. The method may be used with coated paper products comprised of cellulose fibers having a variety of average fiber lengths.

In optional de-watering stage 26, pulp-water slurry 104 is thickened or de-watered. In an example embodiment, pulp-water slurry 104 has a consistency that is dilute, for example, 1% to 5% AD. In this embodiment, pulp-water slurry 104 is de-watered to yield pulp 106 having a consistency in the range of 30% to 50% AD. Any of a number of different types of de-watering assemblies may be used to de-water pulp-water slurry 104 in optional de-watering stage 26. For example, de-watering assemblies may comprise gravity thickeners or deckers, slushers, extractors, filters or a combination of these.

Figure 3:
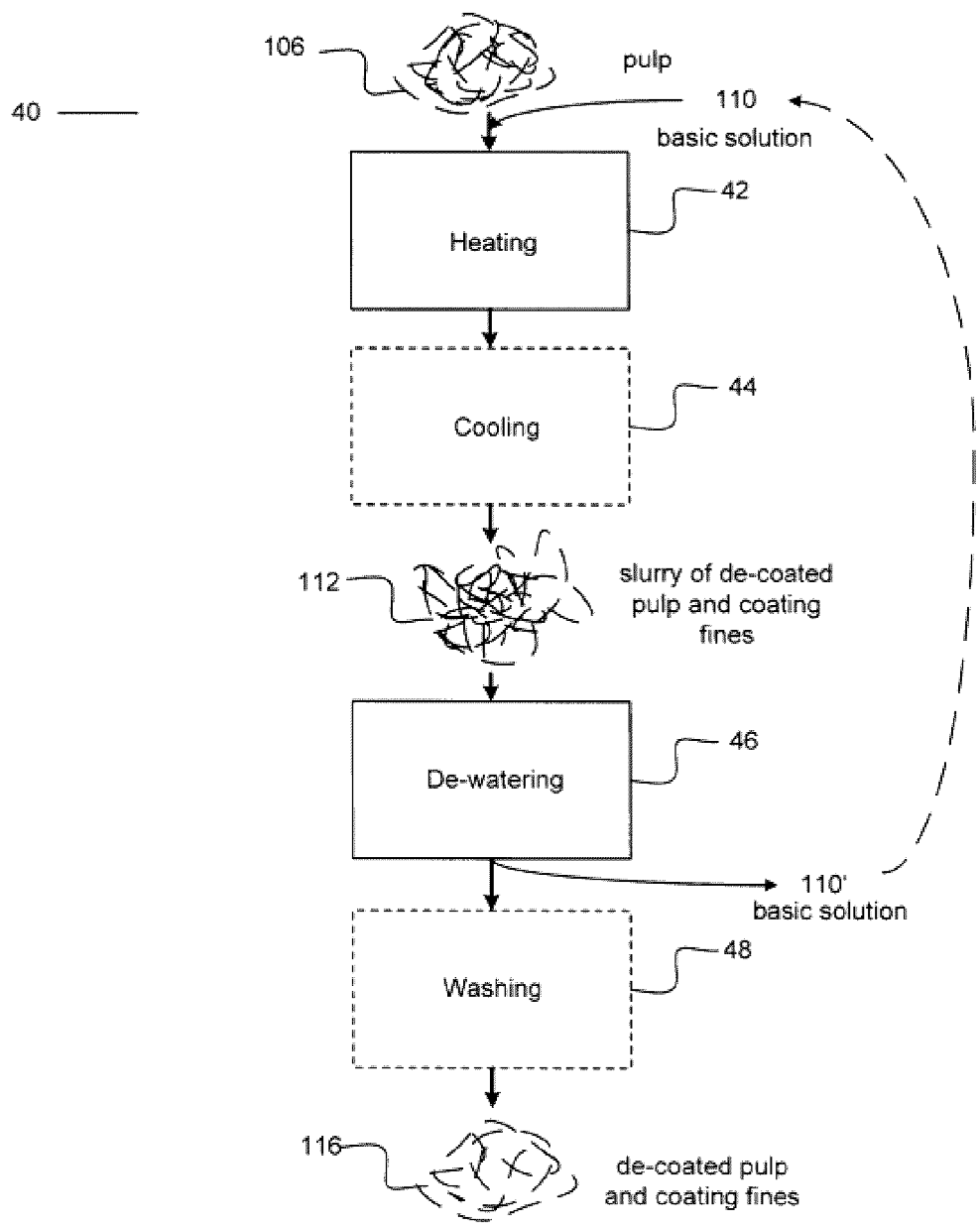
FIG. 3 is a block process diagram illustrating one possible arrangement for the separation step of FIG. 1.

FIG. 3 is a block process diagram showing a possible separation step 40. In a heating stage 42, pulp 106 is heated in basic (i.e. alkaline) conditions for a period of time that is sufficient to produce a slurry 112 of de-coated pulp and coating fines. Optionally, after heating, slurry 112 is allowed to cool in a cooling stage 44. Slurry 112 is then de-watered in a de-watering stage 46, to remove a basic solution 110', leaving de-coated pulp and coating fines 116. Basic solution 110' may be recycled to heating stage 42 to process more slurry 112 of de-coated pulp and coating fines. Optionally, after de-watering stage 46, de-coated pulp and coating fines 116 may be washed in a washing stage 48.

In heating stage 42, pulp 106 is heated in basic conditions. As an example, basic conditions may be achieved by adding basic solution 110 to a vessel prior to, during or after adding pulp 106. Basic solution 110 may comprise an aqueous base, such as a hydroxide (for example, sodium hydroxide or potassium hydroxide). In an example embodiment, basic solution 110 comprises sodium hydroxide. The slurry of pulp 106 in basic solution may have a pH above 10. In an example embodiment, the slurry of pulp 106 in basic solution has a pH in the range of 13 to 14.

Heating stage 42 in separation stage 40 acts to at least partially break bonds between the cellulose fibers and the coating in any coated fibers or particles of coated paper in pulp 106. In an example embodiment using polycoated paper products, heating pulp 106 in basic conditions causes the cellulose fibers to swell and the bond between the polycoat and fibers to break, yielding de-coated pulp and coating fines. The coating fines produced from polycoated paper products may have an average length in the range of 1 to 5 mm and an average diameter of approximately 1 mm. Preferably, the slurry of pulp 106 in basic solution is heated at a temperature, pressure and for a duration of time that is sufficient to break most of the bonds between the cellulose fibers and the coating. The endpoint may be detected by the formation of small particles of coating fines in the slurry.

In one example embodiment, the slurry of pulp in basic solution is heated to a temperature above 125° C. at a pressure in the range of 2 atm to 5 atm and is held at this temperature and pressure for an appropriate time, for example, 30 minutes. The slurry of pulp 106 in basic solution may be heated in a pressure vessel.

Optionally, the resulting slurry 112 of de-coated pulp and coating fines may be allowed to cool or may be cooled before subjecting it to de-watering stage 46 and optionally, washing stage 48. For example, slurry 112 may be allowed to cool to below 50° C.

In de-watering stage 46, slurry 112 is thickened or de-watered. In an example embodiment, slurry 112 has a consistency in the range of 1% to 10% AD. In this embodiment, slurry 112 is de-watered to yield de-coated pulp and coating fines 116 having a consistency in the range of 30% to 50% AD. A number of different types of de-watering assemblies may be used to de-water slurry 112 in de-watering stage 46. For example, de-watering assemblies may comprise gravity thickeners or deckers, slushers, extractors, filters, or a combination of these.

Washing stage 48 may comprise any of various suitable washing or rinsing processes. In one embodiment, in washing stage 48, the pulp is rinsed and filtered. In some embodiments, washing assemblies such as rotary vacuum washers, pressure washers and/or dilution/extraction equipment may be used. Optionally, washing stage 48 may be a multi-staged process.

Figure 4:
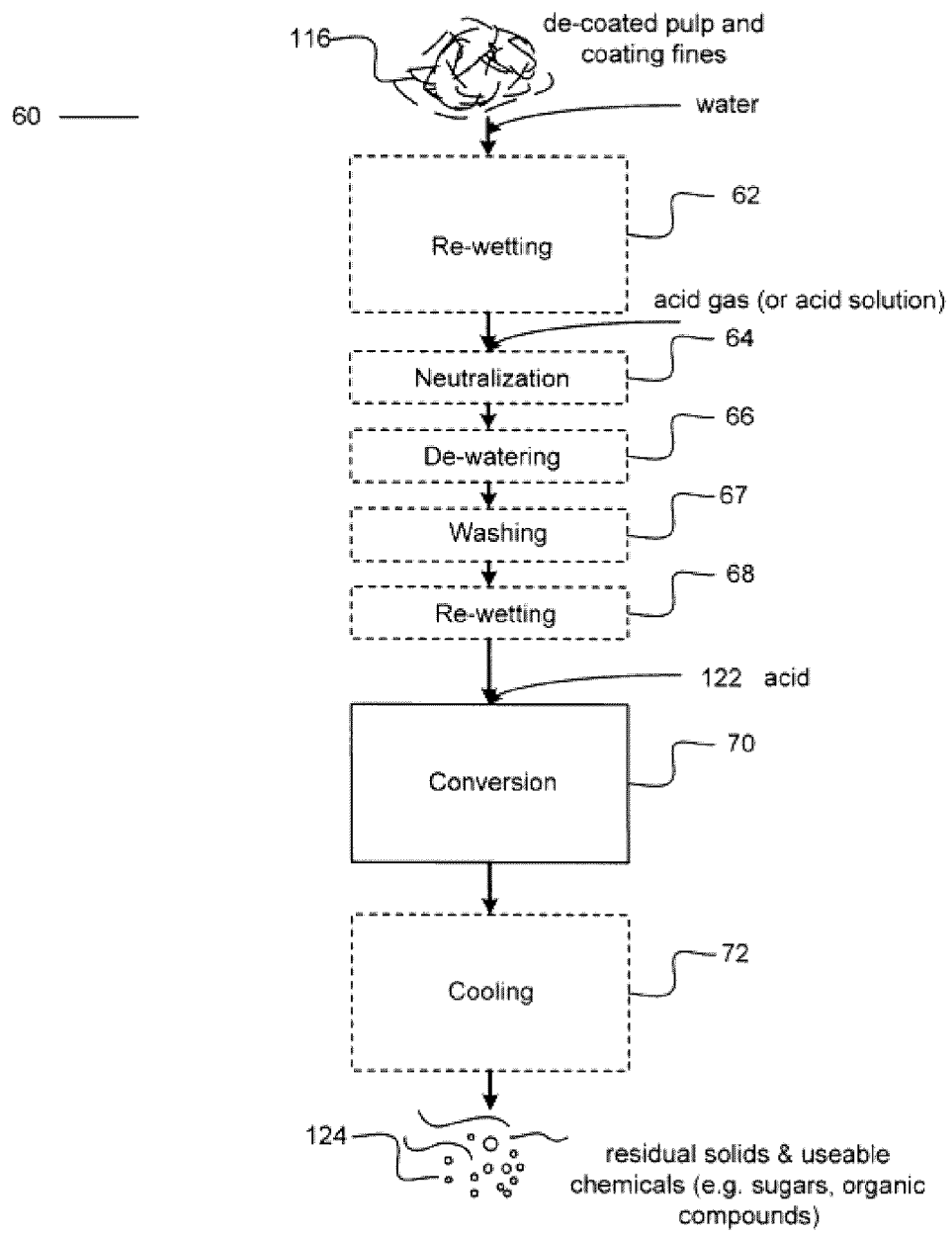
FIG. 4 is a block process diagram illustrating one possible arrangement for the conversion step of FIG. 1.

FIG. 4 is a block process diagram of a possible conversion step 60. De-coated pulp and coating fines 116 may be combined with water in a re-wetting stage 62 before being submitted to a conversion stage 70. Alternatively, de-coated pulp and coating fines 116 are re-wet in conversion stage 70. In conversion stage 70, a slurry of the de-coated pulp and coating fines 116 is heated in acidic conditions for a period of time that is sufficient to produce a mixture of residual solids and useable chemicals. Optionally, this mixture may be cooled or allowed to cool in a cooling stage 72.

Optionally, prior to conversion stage 70, the slurry of de-coated pulp and coating fines 116 may be submitted to a neutralization stage 64. In one example of neutralization stage 64, bubbles of a weak acid gas 120, such as carbon dioxide are released or sparged through the slurry of de-coated pulp and coating fines to neutralize at least some of any base remaining from separation step 40. In another example of neutralization stage 64, the slurry is mixed with a solution of weak acid. Optionally, neutralization stage 64 may be followed by a de-watering stage 66, a washing stage 67 and a re-wetting stage 68, prior to conversion stage 70.

In conversion stage 70, a slurry of the de-coated pulp and coating fines 116 is heated in acidic conditions. As an example, acidic conditions may be achieved by adding one or more acids 122 to a vessel prior to, during or after adding the slurry of the de-coated pulp and coating fines 116. One or more acids 122 may comprise an aqueous acid, such as sulfuric acid or hydrochloric acid. However, depending on the desired products, other acids may be used, for example, weak organic acids, such as maleic acid, malonic acid and/or oxalic acid. The slurry of de-coated pulp and coating fines 116 may have a pH below 5 and below 2 in some embodiments. In an example embodiment, the slurry of de-coated pulp and coating fines 116 has a pH in the range of 0 to 2. Other acids that may be used to achieve acidic conditions include other strong acids such as phosphoric, sulphuric, hydrochloric, or hydrobromic acid; or other weak acids such as carbonic ($H_2CO_3$), formic, acetic, oxalic, maleic, malic, malonic etc. In some embodiments carbonic acid is provided by contacting $CO_2$ with the slurry, for example by sparging $CO_2$ gas through the slurry.

Conversion stage 70 acts to break glycosidic bonds between sugar molecules in the cellulose fibers of the de-coated pulp, yielding sugars 124d. In some embodiments of conversion stage 70, some or all of sugars 124d are degraded to yield other useable chemicals, for example, levulinic acid, formic acid and/or 5-hydroxymethyl furfural. Conversion stage 70 also acts to degrade the coating fines to yield residual solids 124b comprising humins.

Preferably, the slurry of the de-coated pulp and coating fines 116 is heated under acidic conditions at a temperature, pressure and for a duration of time that is sufficient to break substantially all of the glycosidic bonds in the cellulose. In one embodiment, the slurry is acidified to a pH below 1, is heated to a temperature above 175° C. and a pressure in the range of 5 atm to 30 atm and is held at this temperature and pressure for an appropriate time, for example 30 minutes to 4 hours. In conversion stage 70, the slurry of de-coated pulp and coating fines 116 may be heated in a pressure vessel.

Optionally, the resulting mixture 124 of useable chemicals and residual solids may be cooled or allowed to cool in cooling stage 72 before further processing. In one example, mixture 124 is allowed to cool to below 50° C. before product separation step 80.

Figure 5:
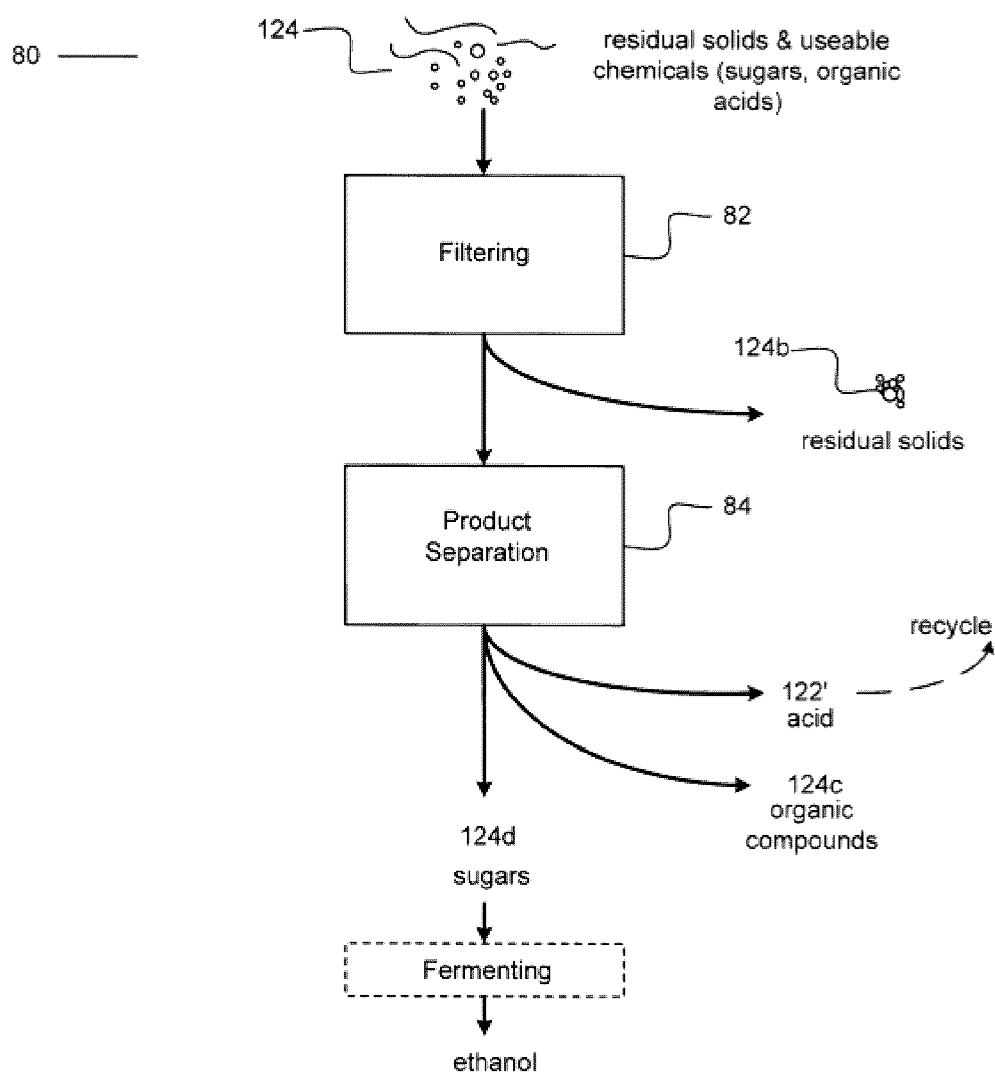
FIG. 5 is a block process diagram illustrating one possible arrangement for the product separation step of FIG. 1.

FIG. 5 is a block process diagram for an example product separation step 80. Mixture 124 of useable chemicals and residual solids in acid is filtered in the filtering stage to remove residual solids 124b. Residual solids 124b may comprise humins and/or other polymeric carbon compounds. Humins are polycarbon solids made up of carbon, hydrogen and oxygen. Humins and similar polycarbon materials make excellent high energy fuels. The presence of oxygen helps such fuels to burn cleanly. In one embodiment, residual solids 124b are dried and pelletized to produce a solid fuel. Alternatively, residual solids 124b can be dried and pelletized with coal to produce a coal-like fuel.

The resulting solution of useable chemicals in acid may be subjected to a product separation stage 84 to separate sugars 124d, organic compounds 124c and acid 120'. In one embodiment, sugars 124d comprise glucose. The glucose may be taken off for use/sale. Alternatively, the glucose may be fermented to produce ethanol, which may be taken off for use/sale. Organic compounds 124c may comprise one or more organic compounds, such as levulinic acid, formic acid, and/or 5-hydroxymethyl furfural. These organic compounds may be separated and taken off for use/sale, for example as industrial chemicals. Optionally, one or more of the useable products may be purified. Acid 120' may be separated and recycled to conversion stage 70 to produce more useable chemicals and residual solids.

Useable chemicals may be separated by any of a number of different separation techniques, such as column chromatography, solvent extraction, or high performance liquid chromatography.

As an example embodiment of the invention, 50 g of coated paper products are combined with 1 L of water in a hydropulper to produce a pulp-water slurry having a consistency of 5% AD. The pulp-water slurry is then de-watered to produce pulp.

The pulp is then combined with 0.25 molar sodium hydroxide solution in a pressure vessel at a ratio of 10 to 20 parts sodium hydroxide solution to 1 part pulp. The quantity of sodium hydroxide solution is sufficient to ensure that all of the pulp is immersed. The container is sealed to prevent the solution from boiling off during heating.

The pressure vessel is heated to a temperature in the range of about 125° C. to 175° C. and is held at this temperature for an appropriate time (for example, 125° C. for 30 minutes). The vessel is then allowed to cool to below 50° C. The vessel is opened and the solution is removed via vacuum filtration. Optionally, the solution is re-constituted and recycled to process more pulp. The de-coated pulp is then rinsed with water.

The washed, de-coated pulp and coating fines is then combined with 0.5 to 1 L water in a pressure vessel. The slurry of washed, de-coated pulp and coating fines in water is then sparged with carbon dioxide to neutralize any remaining hydroxide. Then, a solution of strong aqueous acid, such as hydrochloric or sulfuric acid is added to bring the pH to below 4 or 5 (below 2 in some embodiments). In some embodiments the pH is brought to an acceptably low value by contact with carbon dioxide (which yields carbonic acid). This facilitates performing the complete process within one vessel (a 'one pot' process).

The pressure vessel is then sealed and heated to a temperature above 175° C., for example, 200° C. for an appropriate retention time, for example 30 minutes to 4 hours. The endpoint can be detected by witnessing the disappearance of the fibrous clumps of cellulose and the formation of humins as a fine precipitate. The pressure vessel is then is allowed to cool to below 50° C.

The residual solids are separated from the useable chemicals by vacuum filtration. The residual solids may comprise humins or polymeric carbon compounds. The residual solids can be dried and pelletized as a solid fuel. Alternatively, they may be dried and pelletized with coal to produce a coal-like fuel. The coal like fuel may comprise a polycarbon polymer comprising HMF and glucose derivatives. Such fuel can have an excellent energy density of 27 to 30 JG/tonne and good combustion properties.

Where the desired end product is a solid fuel heating step 42 is optional since small particles of plastic may not be objectionable as components of the solid fuel in at least some applications. In an example alternative embodiment, pulped feedstock is placed in a reactor and either $CO_2$ is bubbled through the pulped feedstock or an acid is added to the pulped feedstock or both. The reactor is then heated to a suitable temperature (e.g. a temperature of at least about 180° C. and typically in the range of 180° C. to 250° C. or 300° C.). The desired temperature will depend on factors such as the pH of the pulped feedstock prior to heating and the time permitted for the treatment to be completed. The stronger the acid (i.e. the lower the pH) the lower the temperature required. The higher the temperature the shorter the treatment time.

For example $CO_2$ may be bubbled through a pulp slurry to produce a pH of ~3-4. The reactor may then be sealed and heated to 220° C. for 1 hour to produce a solid biofuel material in which small plastic coating particles (e.g. 1-2 mm pieces) are present. The biofuel (including any plastic) may be separated by suitable filtration, dried and pressed into pellets, briquettes or the like.

The useable chemicals are processed to separate the glucose, organic compounds and acid. The organic compounds produced may comprise levulinic acid, formic acid and/or 5-hydroxymethyl furfural. These compounds are separated and purified and then may be sold or used. The glucose may be purified and sold or used or may be fermented to ethanol using, for example, *Saccharomyces cerevisiae*.

Figure 6:
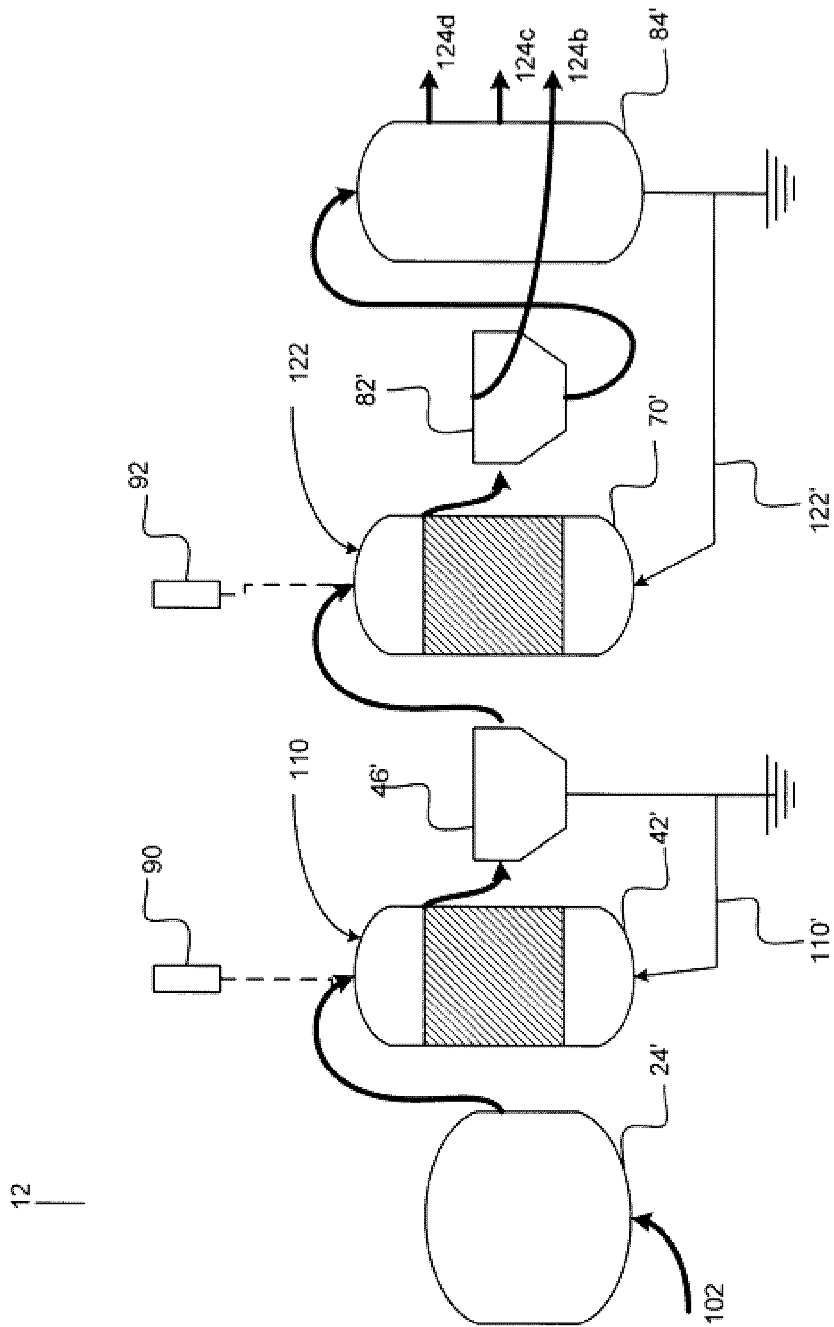
FIG. 6 is a schematic diagram of a batch mode apparatus according to an example embodiment.

FIG. 6 is a schematic diagram of a batch mode apparatus according to an example embodiment. Coated paper products 102 are placed into a pulper in breaking-up stage 24' and are agitated for a duration of time that is sufficient to break coated paper products 102 into a pulp predominantly free of particles of coated paper. The pulp is piped into a pressure vessel in heating stage 42'. Controller 90 monitors the pH of the pulp slurry and triggers the addition of base 110 when the pH is below 10. Controller 90 also maintains the temperature and pressure of the pulp slurry in the ranges of 125-175° C. and 1.5 atm to 5 atm respectively. The pulp is in the vessel of heating stage 42' for a duration of time that is sufficient to break a substantial number of the bonds between cellulose fibers and the coating.

From heating stage 42', a slurry of de-coated pulp and coating fines is piped into a de-watering assembly of de-watering stage 46'. Basic solution 110' is removed from the de-coated pulp and coating fines and is re-constituted and recycled into heating stage 42'. Alternatively, the pulp may be de-watered prior to heating stage 42', and basic solution 110' may be recycled with little or no re-constitution.

The de-coated pulp and coating fines are piped into a pressure vessel in conversion stage 70'. Acid 122 is piped into the pressure vessel to re-wet de-coated pulp and coating fines and to create acidic conditions. Controller 92 monitors the pH, temperature and pressure of the pressure vessel of conversion stage 70'. When the pH rises above 2, controller 92 triggers the addition of acid 122. Controller 92 maintains the temperature and pressure of the slurry of de-coated pulp and coating fines in the ranges of 170° C. to 220° C. and 5 atm to 25 atm respectively. The de-coated pulp and coating fines are heated in conversion stage 70' until substantially all of the cellulose is hydrolyzed into sugars and optionally, organic compounds and the coating fines are degraded into residual solids comprising humins.

The residual solids and useable chemicals from conversion stage 70' are piped into a filter in filtering stage 82'. The residual solids 124b are filtered out and taken off, optionally, for further processing into fuel or coal. The useable chemicals comprising of sugars and/or organic compounds are piped into a resin extraction column (or chromatographic column) of product separation stage 84'. The mixture of useable chemicals in acid is separated into acid solution 122', sugars 124d and organic compounds 124c. Acid 122' is recycled into conversion stage 70'. Sugars 124d and organic compounds 124c are taken off and may be further processed before sale and/or use.

Figure 7:
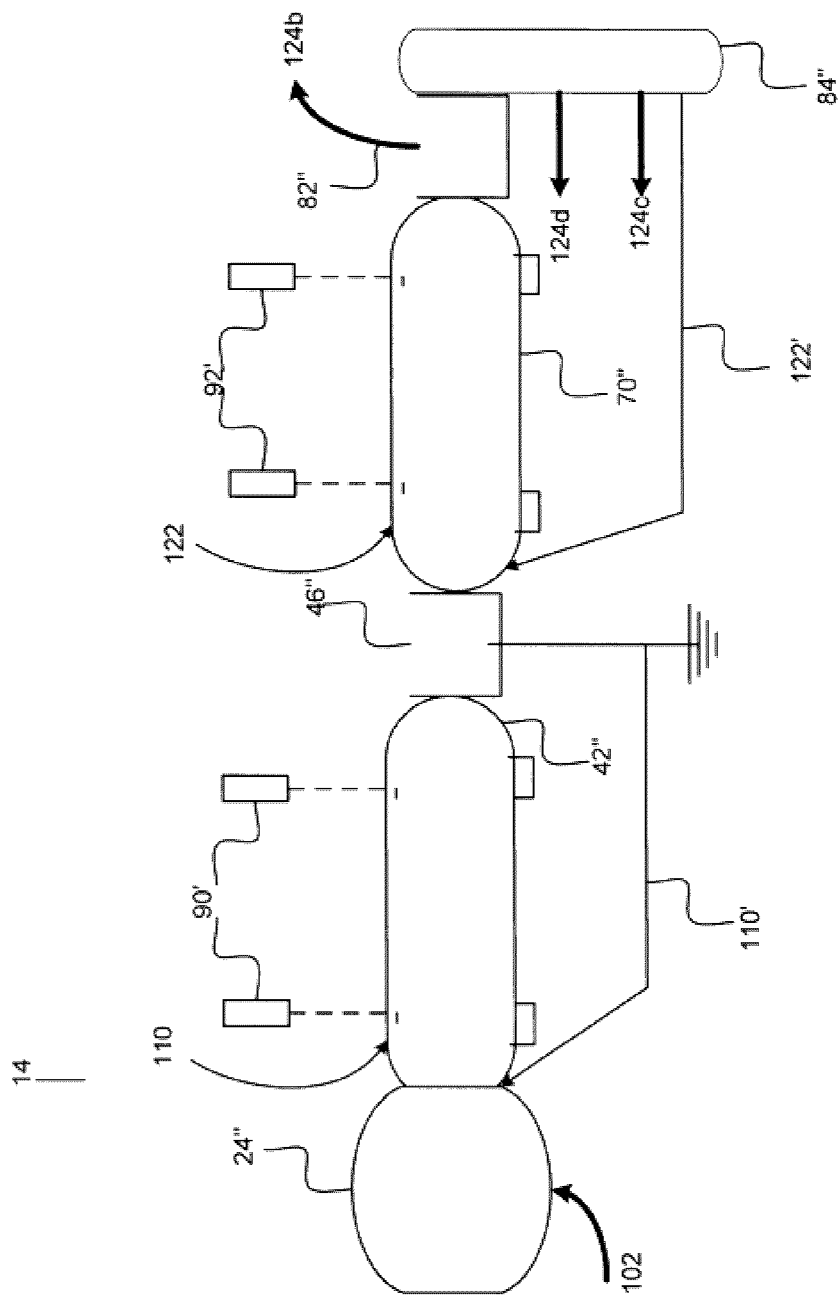
FIG. 7 is a schematic diagram of a continuous mode apparatus according to an example embodiment.

FIG. 7 is a schematic diagram of a continuous mode apparatus according to an example embodiment. Coated paper products 102 are fed into a pulper in breaking-up stage 24" and are agitated. The resulting pulp is fed through a vessel in heating stage 42". The pulp is in the vessel of heating stage 42" for the duration of time that it takes to travel from one end of the vessel to the other. Controllers 90' monitor the pH of the pulp slurry and trigger the addition of base 110 when the pH is below 10. Controllers 90' also maintain the temperature and pressure of the pulp slurry in the ranges of 125-175° C. and 2 atm to 5 atm respectively. FIG. 7 shows two controllers 90'. Alternatively, any other number of controllers 90' may be used.

The resulting slurry of de-coated pulp and coating fines is fed through a de-watering conveyer of de-watering stage 46". Basic solution 110' is removed from the de-coated pulp and coating fines and is re-constituted and recycled into separation stage 42".

The de-coated pulp and coating fines are fed through a vessel in conversion stage 70". Acid 122 is piped into the vessel to re-wet de-coated pulp and coating fines and to create acidic conditions. The de-coated pulp and coating fines are heated in conversion stage 70" for the duration of time it takes to travel from one end of the vessel to the other. Controllers 92' monitor the pH, temperature and pressure of the vessel of conversion stage 70". When the pH rises above 2, controllers 92' trigger the addition of acid 122. Controllers 92' maintain the temperature and pressure of the slurry of de-coated pulp and coating fines in the ranges of 175° C. to 200° C. and 5 atm to 30 atm respectively. FIG. 7 shows two controllers 92'. Alternatively, any other number of controllers 92' may be used.

The residual solids and useable chemicals from conversion stage 70" are fed through a filter in filtering stage 82". The residual solids 124b are filtered out and taken off, optionally, for further processing into solid fuel or coal-like fuel. The useable chemicals comprising sugars and/or organic compounds are piped into a resin extraction column (or chromatographic column) of product separation stage 84". The mixture of useable chemicals in acid is separated into acid solution 122', sugars 124d and/or organic compounds 124c. Acid 122' is recycled into heating stage 70". Sugars 124d and/or organic compounds 124c are taken off and may be further processed before sale and/or use.

While a number of exemplary aspects and embodiments have been discussed above, those of skill in the art will recognize certain modifications, permutations, additions and sub-combinations thereof. It is therefore intended that the following aspects of the invention and any claims hereafter introduced are interpreted to include all such modifications, permutations, additions and sub-combinations as are within their true spirit and scope.

What is claimed is:

1. A method of recycling coated paper products, comprising:
   breaking-up and de-watering the coated paper products to produce a pulp;
   heating the pulp in a basic solution to produce a mixture comprising de-coated pulp and coating fines;
   neutralizing the mixture comprising de-coated pulp and coating fines with a weak acid;

heating the mixture in an acidic solution to produce residual solids and a solution of useable chemicals in acid;

separating the residual solids, useable chemicals and acid gas.

2. The method of claim 1, further comprising cooling, de-watering and washing the mixture comprising de-coated pulp and coating fines.

3. The method of claim 1, further comprising de-watering, washing and re-wetting the mixture comprising de-coated pulp and coating fines.

4. The method of claim 1, wherein the useable chemicals comprise one or more sugars and one or more organic compounds.

5. The method of claim 4, wherein the one or more sugars comprise glucose.

6. The method of claim 4, wherein the one or more organic compounds comprises organic compounds selected from the group consisting of levulinic acid, 5-hydroxymethyl furfural, formic acid, and a combination of these.

7. The method of claim 5, further comprising fermenting the glucose to yield ethanol.

8. The method of claim 1, wherein the basic solution comprises hydroxide solution.

9. The method according to claim 1, wherein the acidic solution comprises an inorganic acid.

10. The method according to claim 9, wherein the inorganic acid comprises an acid selected from the group consisting of sulphuric, hydrochloric, hydrobromic, nitric and phosphoric acids and combinations thereof.

11. The method according to claims 1, further comprising drying the residual solids for use as a fuel.

12. The method according to claim 11, further comprising pelletizing the residual solids.

13. The method according to claim 11, wherein the residual solids have an energy density of at least 20 GJ/Tonne.

14. The method according to claim 11, further comprising mixing the residual solids with fuel particles and pelletizing the mixed residual solids and fuel particles.

15. The method according to claim 14, wherein the fuel particles comprise coal fines.

16. The method according to claim 11, further comprising mixing the residual solids with coal to provide a blended fuel having an average sulfur content lower than that of the coal.

17. A method of recycling coated paper products, comprising:

breaking-up and de-watering the coated paper products to produce a pulp;

heating the pulp in a basic solution to produce a mixture comprising de-coated pulp and coating fines;

heating the mixture in an acidic solution to produce residual solids and a solution of useable chemicals in acid;

separating the residual solids, useable chemicals and acid, wherein the acidic solution comprises an organic acid.

18. The method according to claim 17, wherein the organic acid comprises an acid selected from the group consisting of carbonic, acetic, formic, maleic, malic, malonic, oxalic acids and mixtures of one or more thereof.

19. The method according to claim 17, wherein the organic acid comprises an acid having a pKa in the range of 1.5 to 3.85.

20. The method according to claim 17, further comprising cooling, de-watering and washing the mixture comprising decoated pulp and coatings fines.

21. The method according to claim 17, further comprising neutralizing the mixture comprising decoated pulp and coating fines with a weak acid gas.

22. The method according to claim 17, further comprising de-watering, washing and re-wetting the mixture comprising de-coated pulp and coating fines.

23. The method according to claim 17, further comprising drying the residual solids for use as a fuel.

24. The method according to claim 23, further comprising mixing the residual solids with fuel particles and pelletizing the mixed residual solids and fuel particles.

25. The method according to claim 23, further comprising mixing the residual solids with coal to provide a blended fuel having an average sulfur content lower than that of the coal.

* * * * *